United States Patent
Qiu et al.

(10) Patent No.: US 7,660,986 B1
(45) Date of Patent: Feb. 9, 2010

(54) SECURE CONTROL OF SECURITY MODE

(75) Inventors: Xin Qiu, San Diego, CA (US); Eric J. Sprunk, Carlsbad, CA (US); Paul Moroney, Olivenhain, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/576,516

(22) Filed: May 23, 2000

Related U.S. Application Data

(60) Provisional application No. 60/138,163, filed on Jun. 8, 1999.

(51) Int. Cl.
*H04L 9/32* (2006.01)
*H04N 7/167* (2006.01)

(52) U.S. Cl. ............... 713/166; 380/239; 380/241; 380/242

(58) Field of Classification Search ............ 713/166, 713/170, 182, 200–201; 380/200, 211, 239, 380/277, 281, 282, 284, 241, 202, 242; 709/223–226, 709/229
See application file for complete search history.

(56) References Cited

U.S. PATENT DOCUMENTS

| | | | | |
|---|---|---|---|---|
| 3,790,700 A | * | 2/1974 | Callais et al. ............... 725/114 |
| 4,962,533 A | * | 10/1990 | Krueger et al. ............. 711/163 |
| 5,029,207 A | * | 7/1991 | Gammie ..................... 380/228 |
| 5,172,413 A | * | 12/1992 | Bradley et al. ............. 725/121 |
| 5,461,372 A | * | 10/1995 | Busak et al. ................ 340/5.27 |
| 5,602,916 A | * | 2/1997 | Grube et al. ................. 380/270 |
| 5,805,674 A | * | 9/1998 | Anderson, Jr. ............ 379/93.03 |
| 5,870,474 A | * | 2/1999 | Wasilewski et al. ......... 380/211 |
| 5,878,134 A | * | 3/1999 | Handelman et al. .......... 340/5.6 |
| 5,917,915 A | * | 6/1999 | Hirose ........................ 380/228 |
| 5,930,361 A | * | 7/1999 | Hayashi et al. ............. 380/210 |
| 6,026,164 A | * | 2/2000 | Sakamoto et al. ........... 380/217 |
| 6,047,262 A | * | 4/2000 | Lutz ............................. 705/16 |
| 6,108,583 A | * | 8/2000 | Schneck et al. ................ 700/9 |
| 6,128,735 A | * | 10/2000 | Goldstein et al. ........... 713/166 |
| 6,154,525 A | * | 11/2000 | Formosa ...................... 379/42 |
| 6,266,754 B1 | * | 7/2001 | Laczko et al. ............... 711/203 |

(Continued)

FOREIGN PATENT DOCUMENTS

EP 89 07375 8/1989

(Continued)

OTHER PUBLICATIONS

PCT International Search Report for International Application No. PCT/US00/15944 mailed Oct. 11, 2000.

(Continued)

*Primary Examiner*—Michael Pyzocha
(74) *Attorney, Agent, or Firm*—Stewart M. Wiener

(57) ABSTRACT

A system to change security levels is used to change the level of security used in a secured processing system. The system uses a status indicator to designate the security level being implemented. The security level can be upgraded to allow a higher level of security to be implemented with relative ease. However, in order to change from a higher level of security to a lower level of security, an authorization code is utilized to confirm that the change in security is authorized.

19 Claims, 3 Drawing Sheets

U.S. PATENT DOCUMENTS

| | | | |
|---|---|---|---|
| 6,282,649 B1 * | 8/2001 | Lambert et al. | 713/167 |
| 6,324,646 B1 * | 11/2001 | Chen et al. | 726/6 |
| 6,385,317 B1 * | 5/2002 | Rix et al. | 380/258 |
| 6,434,259 B1 * | 8/2002 | Hamid et al. | 382/115 |
| 6,530,024 B1 * | 3/2003 | Proctor | 713/201 |
| 7,146,506 B1 * | 12/2006 | Hannah et al. | 713/189 |
| 2002/0018571 A1 * | 2/2002 | Anderson et al. | 380/277 |

FOREIGN PATENT DOCUMENTS

| | | |
|---|---|---|
| EP | 99 27654 | 6/1999 |
| WO | WO 99/14887 | 3/1999 |

OTHER PUBLICATIONS

PCT International Search Report for International Application No. PCT/US00/15870 mailed Oct. 11, 2000.

* cited by examiner

SECURE CONTROL OF SECURITY MODE

This application claims the benefit of U.S. Provisional Application 60/138,163 filed on Jun. 8, 1999 which is hereby incorporated by reference.

BACKGROUND OF THE INVENTION

This invention relates generally to the area of cryptography. More specifically, the invention relates to cryptographically securing a change in security levels (e.g., encryption/decryption and authentication levels) used in a data transmission.

In the area of data transmission there is a need to secure messages that are transmitted so as to ensure that the messages are not compromised. One way to ensure this is by way of cryptography to encrypt a message at the transmitting end and to decrypt the received message at the receiving end. In this manner, someone who does not know the key used when the message is encrypted cannot gain access to the message content or successfully modify the message. An example of this need can be seen in systems that encrypt and protect MPEG transport streams. Conditional access messages flow from transmitters to receivers to enable users to view video and audio programs. These conditional access messages should not be compromised. In addition to encryption/decryption, authentication serves as another cryptographic measure used to secure a transmission.

In some systems, the need for security varies depending on the content of the message, as well as who has access to a transmitted signal, etc. Thus, for example, it would be useful if a message signal could be encrypted at different security levels at different points in time. This would facilitate the person transmitting a message to transmit a low level security message at one level of security and to transmit a second message having a higher need for security at a higher level of security.

Encryption algorithms often require a great deal of resources, such as memory for complicated encryption algorithm code, memory to store intermediate data produced by the cryptographic algorithm, processing power, instruction cycles, etc. Thus, one may send a message at the lowest level of encryption that is suitable for that particular message. Consequently, there is a need to be able to send messages that vary by their level of encryption.

Implementing changes in encryption could potentially be very complicated. Hence, when implementing a change to a higher level of encryption or security, it would be desirable to make such a change in a relatively easy manner.

While it is desirable to make a change from a low level of encryption to a high level of encryption in a relatively easy manner, one should make sure that a system is not compromised when a change is made from a high level of security to a low level of security. Namely, while an attacker who feints a change in security from low level to high level would cause the transmitter and receiver to utilize extra processing resources, the sent message would be less likely to be compromised because it would become secured according to a more secure algorithm. However, if an attacker is able to cause a shift to a low level of security from a high level of security, the attacker has made the process of breaking the code that much easier. Therefore, there is a need for a system that allows the change in security levels to be a secure change.

SUMMARY OF THE INVENTION

A method of providing varying levels of security for a data processing system comprises using the system to receive information from an outside source, retrieving an indicator from the received information that instructs the system to operate at a higher level of security, and continuing operation of the system at the high level of security until information is received by the system to indicate a change in security levels.

Similarly, an apparatus comprises an input to receive a datastream, a Security Level Status Indicator, and code to execute a security algorithm indicated by the Security Level Status Indicator.

In accordance with another alternative aspect of the invention, an authorization code signals when the change in security levels is authorized. A master key can be utilized to decrypt this authorization code so as to provide a high level of security for the authorization.

Other features of the invention will be apparent to those skilled in the art from a consideration of the following description taken in conjunction with the accompanying drawings wherein certain methods of and apparatuses for practicing the invention are illustrated. However, it is to be understood that the invention is not limited to the details disclosed but includes all such variations and modifications as fall within the spirit of the embodiments of the invention and the scope of the appended claims.

DESCRIPTION OF THE SPECIFIC EMBODIMENTS

Figure 1A:
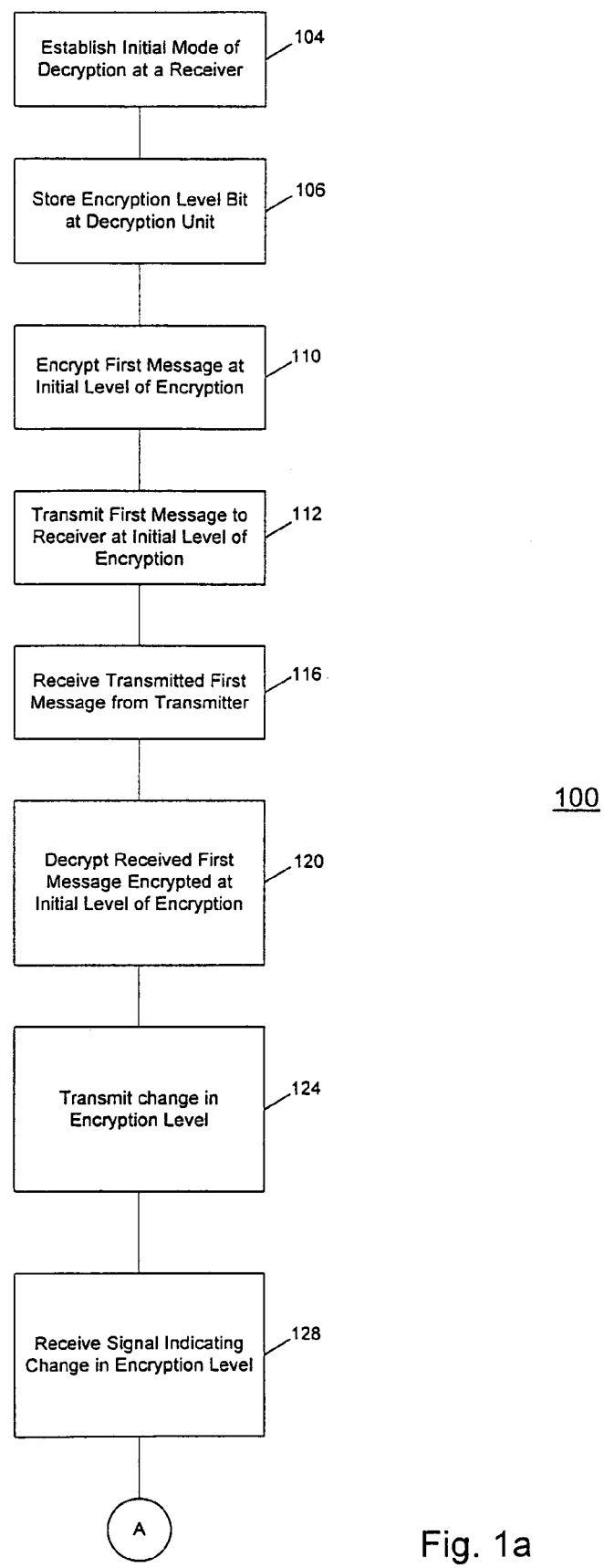
FIGS. 1a and 1b show a flowchart that illustrates the transmitting of messages from a transmitter to a receiver while allowing the security level of the transmitted messages to be changed between a less secure level and a more secure level, for example, when different levels of encryption/decryption are utilized.
Figure 1B:
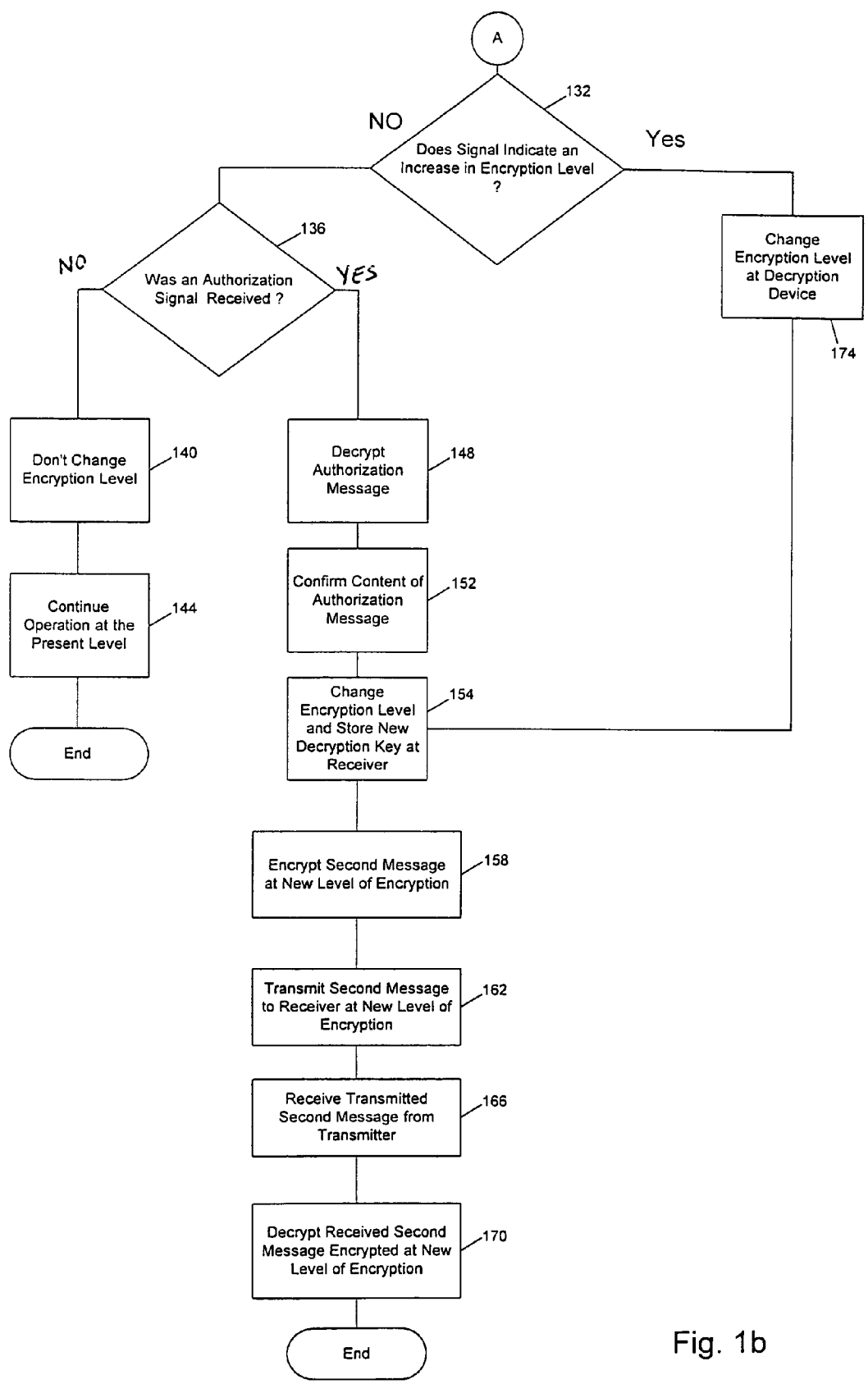

Referring now to FIGS. 1a and 1b, an embodiment of the invention can be seen by reference to flowchart 100. As an example, the different security levels of the invention are described with reference to encryption/decryption. However, it should be understood that other cryptographic aspects of security could be utilized in place of or in addition to encryption, e.g. authentication. In FIG. 1a, a receiver is set up or established to decrypt at a first mode of decryption 104. The processor is electrically coupled to an internal memory such as RAM or ROM. The internal memory stores code for different decryption algorithms. Thus, at initialization, the decryption algorithm designated at initialization is available for use by the processor of the receiver. In addition to the code which implements the decryption algorithm, the processor is also loaded with decryption keys. These keys could reside or be derived in the processor itself rather than being loaded from the external memory of the receiver. This prevents the keys from being compromised by an attacker who is able to read the contents of the memory device. By establishing the key information within the processor, the key information is secured.

Once the receiver is established with the initial level of encryption, an indicator is implemented to indicate the encryption/decryption level at which the system is operating. For a two-level decryption receiver, this could be accomplished by storing a single bit in the decryption unit 106, e.g., receiver. This single bit is capable of designating a high level of decryption, e.g., "1", and a low level of decryption, e.g., "0". This bit could be stored in local memory of the processor or in a register of the processor. At the time of initialization, this bit is set to indicate the initial level of decryption to be implemented by the receiver. When the security level is changed, this bit can then be changed to indicate the new level of security, e.g., level of encryption/decryption.

When multiple security levels are utilized by the system, e.g., multiple levels of encryption at a transmitter or multiple levels of decryption at a receiver, then more than one bit can be utilized to indicate the level of security. Similarly, this multiple bit combination can be stored in the local memory or register of a processor and altered according to a change in security level. Furthermore, this indicator can be stored at both the receiver and the transmitter. In such a fashion, the pair can remain coordinated as to which level of security is being used.

Once an initial encryption/decryption level is established in the transmitter and receiver, messages are encrypted at the initial encryption level 110. This can take place using a processor located at a transmitter to encrypt a message or messages, such as might be carried within an MPEG-2 encoded transport stream. Code for implementing the encryption algorithm will be utilized by the processor to implement the encryption algorithm using the content of a message and any necessary encryption key. Once the message is encrypted, it is then transmitted to the receiver 112 over a communication channel.

At the receiving end of the transmission, the receiver receives the message encrypted at the initial level of encryption 116 from an outside source, e.g., the transmitter at the cable head-end. The receiver then decrypts the encrypted message utilizing the decryption code and decryption key(s) with which it was initialized 120. This process continues with the transmitter sending encrypted messages and the receiver decrypting the messages until a change in the security level is indicated.

The need for a change in security level could arise for a variety of reasons. For example, consider the situation of a cable company that introduces set-top boxes that operate at an initial level of security. That level of security may be acceptable for several years. However, at a later date, there may be a desire to increase the level of security. In such a situation, the cable company could implement the change to the higher level of security. Furthermore, if problems are caused in the cable system by the change to the higher level of security, then the cable system could temporarily switch back to the lower level of security until those problems are resolved. Then the switch to the higher level of security could be made again. This is but one example of how the invention could be useful. It might also be desirable to use it as a way of changing security on a program by program basis or a time of day basis, as circumstances may warrant.

One way to indicate a change in encryption/decryption levels is by transmitting an indicator that indicates the level of security being implemented by the change 124. Such an indicator is referred to as a Security Level Status Indicator (SLSI) and indicates what level of security is being implemented. For example, it can indicate the corresponding level of encryption/decryption being implemented by the change. The SLSI can simply be a single bit that makes up part of another message or it could be a message unto itself. For example, it is envisioned that a single bit of an Entitlement Management Message (EMM) or Key Management Message (KMM) that is sent by cable operators to their individual customers could serve as the SLSI. Furthermore, the SLSI need not be limited to a single bit. It could be longer to indicate more than two security levels, e.g., encryption/decryption levels.

The SLSI or other signal sent by the transmitter is then received at the receiver 128. When the SLSI is embedded within a longer message such as an EMM or KMM, the decryption device, e.g., the receiver, will need to parse out the SLSI in order to analyze whether a change in the security level has occurred. Essentially, the receiver can determine whether a new SLSI has been received by comparing the new SLSI value with the old SLSI value stored at the receiver.

If a change in the SLSI value is detected, it is tested to determine whether it indicates a change from a low level security algorithm to a higher level security algorithm (e.g., by changing from a "0" to a "1") 132. If this is the case, the SLSI value stored at the receiver should be updated (e.g., by changing the SLSI value in the processor to a "1").

Normally, a false indication of a change from a low level of encryption/decryption to a higher level of encryption/decryption will not be a concern. Such a change would simply make an attacker's job more difficult. So, it is unlikely that an attacker would purposely try and alter the SLSI in such a manner. Rather, it would be expected that an attacker would try and decrease the security level being used by a system in order to have a greater chance of breaking a less difficult security system.

Hence, in one mode of the invention, the encryption/decryption level at the decryption device is increased if an increase in encryption/decryption level is indicated 174. This occurs by switching to use of the higher level of decryption code stored in the local memory of the processor in the receiver. Any keys associated with the new decryption level may be positioned so as to be more readily accessible. This might occur by moving the keys from local memory to a register which has a faster access time. Once the information for the new decryption level has been loaded, the receiver can receive a message encrypted at the new higher level of encryption and process it accordingly. A user might choose to encrypt the SLSI even when an increase in security is implemented. In such a case, the bit of the SLSI can be encrypted by the transmitter and decrypted at the receiver.

Alternatively, one might want to decrease the encryption/decryption level being used from a higher level of encryption/decryption to a lower level of encryption/decryption. In such a case, it is important to be able to verify that the instruction to change the encryption/decryption level is legitimate in order to prevent an attacker from compromising the system.

One method of downgrading the security level is by transmitting an authorization signal to the receiver to indicate the downgrade. This authorization signal shall be referred to as a Decreased Security Authorization Code (DSAC) since it is typically a coded signal that is transmitted to indicate that the security level can be reduced from a higher security level to a lower security level.

Continuing with the example of FIG. 1b, the receiver checks to see if a DSAC has been received 136. If no DSAC is received, then encryption/decryption levels are not changed 140. Furthermore, operation continues at the present or higher level of encryption/decryption 144. However, if a DSAC is received, it is tested to determine its content. In one embodiment, the DSAC is encrypted and authenticated. Hence, it will be decrypted 148 and its authentication verified. The content of the DSAC is then confirmed 152, e.g., by comparing the value of the DSAC to the SLSI value held by the receiver. Thus, in the absence of an authorization signal, an unauthorized decrease in security level is prevented. After confirming that a change in encryption/decryption level has been indicated, the SLSI value held by the receiver is updated to reflect the change in the encryption/decryption level status.

The DSAC can be transmitted as part of a Key Management Message (KMM). A Key Management Message is used in encrypted systems to transmit new keys used by the decryption algorithms. Thus, it allows new keys to be switched at periodic intervals in the receiver to prevent attackers from compromising the system. Consequently, when the Key Management Message is transmitted, the longest and strongest key held by the receiver is typically used to decrypt the KMM. Thus, the KMM is considered to have a very high level of security. Therefore, it is a suitable vehicle for transporting the DSAC. In this way, the DSAC can be included as part of the KMM and decrypted by a key of the receiver that is used to provide the highest level of security, i.e., the master key. Therefore, it is unlikely that an attacker can change the level of security being used by the system.

Furthermore, delivery of the DSAC may also be protected against replay attacks. That is you could not re-use a message to re-lower security. This would require that messages authorizing a decreased security level be different. This can be implemented by providing code for algorithms which prevent replay attacks, such as those disclosed in "Applied Cryptography $2^{nd}$ Edition," by Bruce Schueier, John Wiley and Sons, Inc., which is hereby incorporated by reference for all that it discloses and for all purposes.

When a DSAC signal is received and confirmed, the security level is changed and the SLSI is updated to reflect the change. The SLSI would be stored in a register of the processor or in local memory of the processor, so the changing of its value is straightforward. Any keys necessary for implementing a new decryption level should be moved or loaded into their designated locations in the processor memory or registers. At the time of changing the encryption/decryption level, it might also be desirable to load a new key to the receiver 154. This is facilitated if the DSAC is made part of the KMM which is used to transport new keys.

Once the encryption level is changed, a new message can be encrypted at the second level of encryption by the transmitter 158. This message can then be transmitted to the receiver at the second level of encryption 162. The receiver would then receive the encrypted message 166 and decrypt the encrypted message utilizing the second level of decryption code stored by the receiver 170. This process can then be repeated as needed to facilitate the need for a high level of security and the need for efficient processing made possible by lower levels of security in transmissions.

Figure 2:
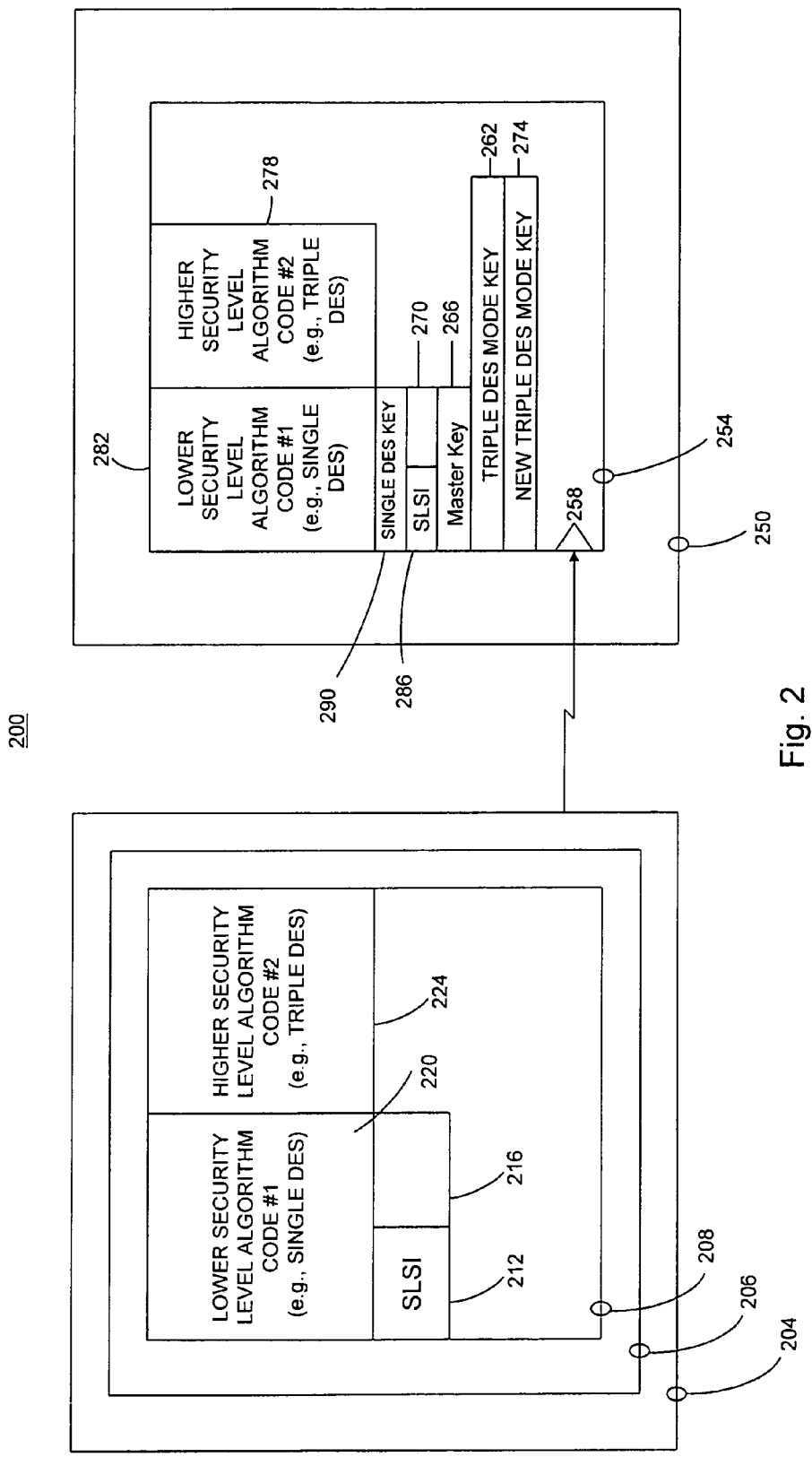
FIG. 2 shows transmitter and receiver circuits for transmitting messages and using different algorithms and keys that allow the security level of the transmissions to be altered.

A system 200 for practicing an embodiment of the invention can be seen in FIG. 2. FIG. 2 shows a transmitter 206 and a receiver 250. For example, the transmitter could be located in a cable headend 204 and the receiver could be a set-top box located at a cable customer's home. The transmitter may be comprised of an integrated circuit such as a processor 208. This circuit could include Algorithm Code #1 220, which corresponds to the algorithm used to provide the lower level of cryptography. Similarly, it would also include Algorithm Code #2 224 which corresponds to the algorithm used to provide the higher level of cryptography. The transmitter could store in its local memory 216 a value corresponding to the Security Level Status Indicator (SLSI) 212 which indicates the level of security being used by the system.

The receiver 250 houses an integrated circuit such as security processor 254. An input 258 of the processor is coupled to the input signal from an outside source, e.g., the transmitter. The processor stores the code for the lower level security algorithm 282 and code for the higher level security algorithm 278 in its internal memory. The Security Level Status Indicator (SLSI) 286 is stored in a register or local memory of the processor. When the Decreased Security Authorization Code is received, it can be stored in local memory 270 of the processor for processing. The master key 266 may be stored in a register or local memory of the processor to protect its integrity. Similarly, any new keys received, such as a new Triple DES key 274 should be stored in a register or local memory of the processor as well. FIG. 2 shows that the single DES key 290 and the existing Triple DES key 262 are stored by the processor as well.

As one example, it is envisioned that the system could operate at two levels of encryption/decryption. Namely, it is envisioned that single DES could serve as the low level of encryption while Triple DES could serve as the high level of encryption. However, it is also possible that additional algorithms could be used as well. Thus, the system could operate at a variety of levels. Furthermore, it is noted that those various encryption/decryption levels could be public key or non-public key systems, for example.

While the invention has been described in regard to increasing security of a system by way of changing encryption/decryption levels, it should be understood that the invention is also applicable to changes in the level of authentication used in a transmission system. Thus, where the invention has been described above as a system for protecting privacy by way of encryption and decryption, it should also be understood to apply to changing, for example, digital signature requirements, as a way of changing authentication levels. Furthermore, it should be understood that changes in both encryption/decryption and authentication levels can be accomplished with the invention.

Furthermore, where the invention has been described as being accomplished by a processor executing code, it should be understood that the invention may also be accomplished by various combinations of hardware and software, e.g.: individual hardware components; hardware controlled by software; a combination of hardware and software; or even software alone. Thus, as one example, hardware distinct from the processor could be utilized to encrypt an MPEG-2 transport stream while a processor performs other encryption duties.

In addition to embodiments where the invention is accomplished by hardware, it is also noted that these embodiments can be accomplished through the use of an article of manufacture comprised of a computer usable medium having a computer readable program code embodied therein, which causes the enablement of the functions and/or fabrication of the hardware disclosed in this specification. For example, this might be accomplished through the use of hardware description language (HDL), register transfer language (RTL), VERILOG, VHDL, or similar programming tools, as one of ordinary skill in the art would understand. Therefore, it is desired that the embodiments expressed above also be considered protected by this patent in their program code means as well.

It is also noted that many of the structures and acts recited herein can be recited as means for performing a function or steps for performing a function, respectively. Therefore, it should be understood that such language is entitled to cover all such structures or acts disclosed within this specification and their equivalents.

It is thought that the apparatuses and methods of the embodiments of the present invention and many of its attendant advantages will be understood from this specification and it will be apparent that various changes may be made in the form, construction and arrangement of the parts thereof without departing from the spirit and scope of the invention or sacrificing all of its material advantages, the form herein before described being merely exemplary embodiments thereof.

What is claimed is:

1. A method of providing varying levels of security in a data processing system, the method comprising:
   receiving information from an outside source;
   retrieving a first indicator form the received information that instructs the system to operate at a higher level of security;
   receiving further information from said outside source;
   retrieving a separate second indicator from said further information received from said outside source, the second indicator for instructing the system to operate at a lower level of security than the higher level of security instructed by the first indicator;
   receiving an encrypted message that authorizes the system to operate at the lower level of security;
   authenticating the encrypted message; and
   preventing operation at the lower level of security until a decrease in security levels is indicated by said second indicator and the encrypted message; while continuing operation of said processing system at the higher level of security.

2. The method of claim 1 wherein the encrypted message comprises a Decreased-Security-Authorization-Code.

3. The method of claim 2 wherein said Decreased-Security-Authorization-Code authorizes a decrease in encryption/decryption levels.

4. The method of claim 2 wherein said Decreased-Security-Authorization-Code authorizes a decrease in authentication level.

5. The method of claim 2 wherein said Decreased-Security-Authorization-Code authorizes a decrease in authentication level and a decrease in encryption/decryption levels.

6. The method of claim 2 wherein said encrypted message further comprises a key for use in a decryption algorithm.

7. The method of claim 6 wherein said system stores a master key to decrypt messages comprising new decryption key values and further comprising:
   using said master key stored at said system to decrypt said encrypted message.

8. The method of claim 1 and further comprising:
   establishing a Security-Level-Status-Indicator at said system to indicate a level of security that is being implemented by the system.

9. The method of claim 8 wherein said Security-Level-Status-Indicator indicates a level of encryption/decryption that is being implemented by the system.

10. The method of claim 8 wherein said Security-Level-Status-Indicator indicates a level of authentication that is being implemented by the system.

11. The method of claim 8 wherein said Security-Level-Status-Indicator indicates a level of authentication and a level encryption/decryption that is being implemented by the system.

12. The method of claim 8 and further comprising:
   configuring said Security-Level-Status-Indicator to indicate more than two security levels so as to allow said system to utilize more than two security levels.

13. The method of claim 1 and further comprising:
   utilizing a cable head-end as said outside source; and
   utilizing a set-top box in order to retrieve the first and second indicators from the information received from the cable head-end.

14. The method of claim 2 and further comprising using a Key Management Message to convey said Decreased Security Authorization Code.

15. The method of claim 14 wherein delivery of said Key Management Message is authenticated.

16. The method of claim 14 wherein delivery of said Key Management Message is protected against a replay attack.

17. The method of claim 14 wherein delivery of said Key Management Message is authenticated and protected against a replay attack.

18. The method of claim 1 wherein a lower level of security is non-public Key mode, wherein a higher level of security is a public Key mode, the method further comprising:
   continuing operation of the system in the public Key mode until an encrypted predefined message is received by the system from the outside source.

19. The method of claim 18 wherein said system stores a master key to decrypt messages comprising new decryption key values and further comprising:
   using said master key stored at said system to decrypt said encrypted message.

* * * * *